(12) United States Patent
Knowles et al.

(10) Patent No.: US 6,196,016 B1
(45) Date of Patent: Mar. 6, 2001

(54) MULTIPLE-DOSE, FLUSH-THROUGH INJECTOR

(75) Inventors: Steven M. Knowles, Silver Lake, IN (US); Terrence D. Kalley, Troy, MI (US)

(73) Assignee: Bright Solutions, Inc., Troy, MI (US)

( * ) Notice: Subject to any disclaimer, the term of this patent is extended or adjusted under 35 U.S.C. 154(b) by 0 days.

(21) Appl. No.: 09/316,726

(22) Filed: May 21, 1999

(51) Int. Cl.[7] ........................................... F25B 45/00
(52) U.S. Cl. ........................... 62/292; 222/135; 222/145.5
(58) Field of Search .............................. 62/292; 222/135, 222/145.5

(56) References Cited

U.S. PATENT DOCUMENTS

| | | | |
|---|---|---|---|
| 3,717,008 | * 2/1973 | Brandy | 62/292 |
| 3,795,262 | 3/1974 | Post | 141/1 |
| 4,467,620 | * 8/1984 | Bradley et al. | 62/292 |
| 4,698,983 | * 10/1987 | Hechavarria | 62/292 |
| 4,938,063 | 7/1990 | Leighley | 73/40.7 |
| 5,027,605 | 7/1991 | Hardesty | 62/77 |
| 5,170,632 | 12/1992 | Reilly, Jr. et al. | 62/77 |
| 5,336,065 | * 8/1994 | Tieken | 417/437 |
| 5,363,665 | * 11/1994 | Sundman | 62/125 |
| 5,363,666 | * 11/1994 | Tieken | 62/129 |
| 5,375,425 | * 12/1994 | Cobb | 62/77 |
| 5,444,988 | 8/1995 | Eden | 62/125 |
| 5,540,254 | * 7/1996 | McGowan et al. | 137/315 |
| 5,673,722 | * 10/1997 | Brass | 137/15 |
| 5,699,678 | 12/1997 | Trigiani | 62/292 |
| 5,826,636 | 10/1998 | Trigiani | 141/382 |
| 5,967,204 | * 10/1999 | Ferris et al. | 141/383 |
| 6,029,720 | * 2/2000 | Swinford | 141/385 |
| 6,050,310 | 4/2000 | Trigiani | 141/382 |
| 6,056,162 | 5/2000 | Leighley | 222/156 |

OTHER PUBLICATIONS

Instructions for Fluorescent Tracer Dye Injection Tool with illustrations "A"–"F" (undated).
Instructions for Bright Solutions, Inc. Ratchet Gun UV Dye Delivery System (Nov. 1, 1998).
Instructions for Robinair Oil/Dye Injector #61566RA.
Advertisement for Models 16256 and 16258 Syringe–Type Oil Injectors (undated).
Advertisement for PRO–SET® Oil Injectors.
Advertisement for VIPER–EYES™ Model 471600 Injector Gun Assembly (undated).
Advertisement for SPOTGUN™ Injection System (undated).
Catalog page describing EZ–JECT™ Multi–Dose Dye Injection System Kits (undated).
Catalog page showing TRACERLINE® Product No. TP–3880 dye injector (undated).
Advertisement for TRACERLINE® TP–3887 Universal Connector Set (Dec. 1995).
Catalog page showing BAYCO due injector models SL–114, SL–114A, SL–116, SL–115, SL–115A, SL–117, SL–122, SL–123 and SL–124.
Internet advertisement for CLIPLIGHT injector model 701, 703, and 710 (Nov. 14, 1997).

* cited by examiner

*Primary Examiner*—William Doerrler
*Assistant Examiner*—Mark Shulman
(74) *Attorney, Agent, or Firm*—Fish & Richardson P.C.

(57) ABSTRACT

Devices and methods for multiple-dose injection of a liquid, e.g., a leak detection dye or a compressor lubricant, into a closed system, e.g., a refrigeration system, are disclosed. Fluid flow through the closed system is used to flush the liquid into the system.

32 Claims, 10 Drawing Sheets

MULTIPLE-DOSE, FLUSH-THROUGH INJECTOR

FIELD OF THE INVENTION

The field of the invention is refrigeration systems and refrigeration system servicing.

BACKGROUND OF THE INVENTION

Refrigeration systems, including mobile units and stationary units, require servicing from time to time. Refrigeration system servicing often involves the introduction of a fluorescent, leak detection dye into the system. Servicing similarly can involve the introduction of a liquid compressor lubricant, e.g., a mineral oil, a polyol ester, or a polyalkylene glycol. These liquids are introduced into refrigerant systems by means of devices commonly called "dye injectors" (or "oil injectors"). Although various dye injectors have been used, they can be generally classified into two types, i.e., flush-through-type and injection-type.

The feature that distinguishes conventional flush-through injectors is that refrigerant flow supplies the force that moves (flushes) the liquid dye from the injector into the refrigeration system. Conventional flush-through injectors are single-application devices. This means that the injector must be opened and refilled with dye, for each dose of dye injected. An additional limitation is that the dose per injection is fixed at the capacity of the dye chamber, which must be filled completely, to avoid introducing air into the refrigeration system.

The feature that distinguishes conventional injector-type devices is that the concentrated liquid dye is displaced from the injector by a mechanical pushing mechanism, instead of refrigerant flow. In other words, the fluid does not flow through the injector. This type of design is analogous to a caulking gun or a drug syringe. Conventional injectors allows multiple injections. However, unless the injector output hose remains filled with dye, it must be purged of air each time the injector is connected to a refrigeration system. With this type of device, a small amount of dye often remains at the point of attachment between the injector and the refrigeration system.

SUMMARY OF THE INVENTION

In general, the invention provides devices and methods for multiple-dose, injection of a liquid or paste into a closed system, using fluid flow through the closed system to move the liquid into the system. Thus, the invention achieves the advantages of a flush-through injector with the advantages of an injection-type injector, while avoiding their respective limitations.

The invention features a device for introducing a liquid or paste into a closed, fluid system. The device includes a fluid flow path between a fluid input port and a fluid output port; a liquid reservoir; a one-way reservoir output valve between the liquid reservoir and the fluid flow path, which valve is biased toward closure of a liquid reservoir outlet; and a liquid-expelling mechanism, whereby liquid or paste can be expelled from the liquid reservoir, through the one-way reservoir output valve, into the fluid flow path.

In some embodiments, the liquid reservoir includes a cylinder wall, and the liquid-expelling mechanism includes a piston. Some embodiments of the invention include a liquid flow path between the one-way reservoir output valve and the fluid flow path. The device can include a batch chamber in fluid communication with the fluid output port, and a one-way fluid input valve biased toward closure of the fluid input port. Typically, the ratio of liquid reservoir volume to batch chamber volume is at least 2:1, e.g., 10:1, 50:1 or 100:1. The batch chamber wall can be substantially transparent, thereby permiting visual confirmation of batch chamber filling and emptying. The device can include a shutoff valve (or service coupling) at the end of an output hose. This allows the device to be connected successively to different refrigeration systems without re-purging, once air is initially purged from the device. The device can include a mechanism for controllably moving the piston. The mechanism can be a threaded push rod and an actuation knob. For convenience in dispensing measured amounts of liquid, the actuation knob can be calibrated in relation to liquid reservoir volume, e.g., one batch chamber volume per knob rotation.

Some embodiments include a one-way valve biased in the closed position, at a reservoir fill port. Such an embodiment can include a push rod, with a handle and a handle pivot bar, for controllably moving the piston. The liquid reservoir input fitting can be compatible with an output fitting on a liquid source such as a detachable dye cartridge. In such an embodiment, the ratio of reservoir volume to batch chamber volume can be about 1:1, while the ratio of cartridge volume to reservoir volume is at least 2:1, and preferable at least 10:1.

Some embodiments of the invention are dual injectors, which include a second liquid reservoir, one-way valve, and liquid expelling mechanism associated with a single fluid flow path. Such embodiments provide for convenient injection of two different liquids, e.g., fluorescent leak detection dye and compressor lubricant, into a refrigeration system, using a single injector. Alternatively, both liquid reservoirs of a dual injector can be filled with the same liquid, thereby doubling the capacity for a single liquid.

The invention provides a refrigeration system service apparatus. The service apparatus includes a refrigerant reservoir, e.g., a conventional refrigerant cylinder, and an injector device as described above. The injector device can remain mounted on the refrigerant reservoir while the service apparatus is connected, disconnected, and reconnected to successively-serviced refrigeration systems. The refrigerant can be dispensed from the service apparatus with the injector remaining passive unless and until actuated.

The invention features a method for introducing a liquid or paste into a closed system. The method includes: (a) providing a fluid flow path that includes a one-way fluid input valve and a fluid output port; (b) providing a liquid reservoir; (c) providing a one-way reservoir output valve that permits liquid or paste to flow from the liquid reservoir into the fluid flow path at a point between the fluid input valve and the fluid output port; (d) connecting the fluid flow path into the closed system; and (e) forcing liquid or paste from the liquid reservoir, through the one-way reservoir output valve, into the fluid flow path, at a point between the fluid input valve and the fluid output port.

Examples of closed systems on which the method can be used include refrigeration systems, e.g., mobil air conditioners and stationary refrigeration systems. The method is useful for injecting a fluorescent leak detection dye, compressor lubricant, or other liquid, into a refrigeration system.

As used herein, "liquid reservoir" means an enclosure from which a liquid or paste is expelled through a one-way reservoir output valve, into a fluid flow path.

As used herein, "fluid" means a gas or a liquid.

Unless otherwise defined, all technical and scientific terms used herein have the same meaning as commonly understood by one of ordinary skill in the art to which this invention belongs. In case of conflict, the present application, including definitions will control. All publications, patent applications, patents, and other references mentioned herein are incorporated by reference.

Although methods and materials similar or equivalent to those described herein can be used in the practice or testing of the present invention, the preferred methods and materials are described below. The materials, methods, and examples are illustrative only and not intended to be limiting. Other features and advantages of the invention will be apparent from the detailed description, and from the claims.

BRIEF DESCRIPTION OF THE DRAWINGS

FIG. 5 is a sectional view of an injector with reservoir and batch chamber in an in-line arrangement. FIG. 5 depicts a threaded piston push rod that rotates (thereby moving a threaded piston sleeve) without translating axially.

DESCRIPTION OF THE PREFERRED EMBODIMENTS

Referring to the drawings, wherein like numerals indicate like elements throughout, FIGS. 1–4 show an injection device 10 for injecting dye or lubricant into a refrigeration system such as an automobile air conditioner. The device 10 allows a controlled, variable amount of liquid to be repeatedly injected without opening the device or repurging.

Refrigerant flows into the injection device 10 from a gauge set, cylinder 31, R&R (recovery and recycling) machine, or any refrigerant charging system or refrigerant supply, through input hose 30 and an input fitting 29. The refrigerant enters the device 10 by opening the fluid input check valve 18, which is biased into the closed position by spring 32, but opens inwardly in response to fluid pressure. The refrigerant flows through the fluid flow path 15, and then through the batch chamber 20, and exits through the output fitting 21 and output hose 22. Thus, the refrigerant charging system operates normally, after the device 10 has been installed. As explained below, dye is injected only upon demand, i.e., when the injector is activated. Between activations, the device 10 conveniently can remain plumbed into the refrigerant charging system.

The input hose 30, output hose 22, and the device itself 10, are purged of air when the device is initially plumbed into the refrigerant charging system. The hoses 30, 22 and the fluid flow path 15 of the device 10 remain filled with refrigerant after the initial purge and do not require purging again, as long as the device 10 remains installed. The use of a shutoff valve (not shown) at the end of the output hose 22 allows a refrigeration system servicing apparatus 52 (refrigerant cylinder 31, injector 10, and output hose 22) to be moved sequentially from one refrigeration system to another without purging air, or refilling with liquid dye (or lubricant). The refrigerant charging system operates normally with the injection device 10 plumbed into it.

The liquid reservoir 11 is filled by pouring fluorescent leak detection dye through a liquid reservoir fill port 49 (shown closed by a threaded fill port plug 28) located on top of the device 10. As dye fills the reservoir 11, it displaces air in the reservoir 11.

Dye is injected only when the injection device 10 is actuated. In preparation for dye injection, the user turns the actuation knob 24. This causes the threaded push rod 23 to translate the piston 13, in the cylinder 12, toward the one-way reservoir output valve (check valve) 19. The push rod 23 causes piston translation through engagement of threads on the inside surface of a hollow piston sleeve 53. A rotation stop 26 prevents the piston sleeve 53 from rotating with the threaded push rod 23. Pressure applied by the piston 13 causes dye in the liquid reservoir 11 to open the reservoir output check valve 19, which is biased toward closure by spring 33. Backflow around the piston 13 is prevented by a piston seal 14 (O-ring). The dye flows through the reservoir output port 16, through the liquid flow path 17, into the fluid flow path 15, through the fluid output port 46, and into the batch chamber 20. A transparent batch chamber wall 48 enables visual confirmation of batch chamber 20 filling and emptying. The reservoir output check valve 19 returns to the closed position, after piston movement stops and the pressure applied by the piston is relieved by the flow of dye into the batch chamber 20. Once in the batch chamber 20, the dye remains there until refrigerant is flushed through the batch chamber 20. When the refrigerant supply source is activated, refrigerant flow sweeps the dye from the batch chamber 20 into the output hose 22 and into the refrigeration system. Only the amount of dye (or lubricant) placed in the batch chamber 20 enters the refrigeration system upon each injection.

Following an injection, unused dye (or lubricant) remains in the liquid reservoir 11. Until dye is desired, the injector 10 remains plumbed into the refrigerant charging system and remains passive. When dye is desired, the injector 10 is actuated, the batch chamber 20 is filled, and dye is again swept into the refrigeration system, as described above.

Figure 1:
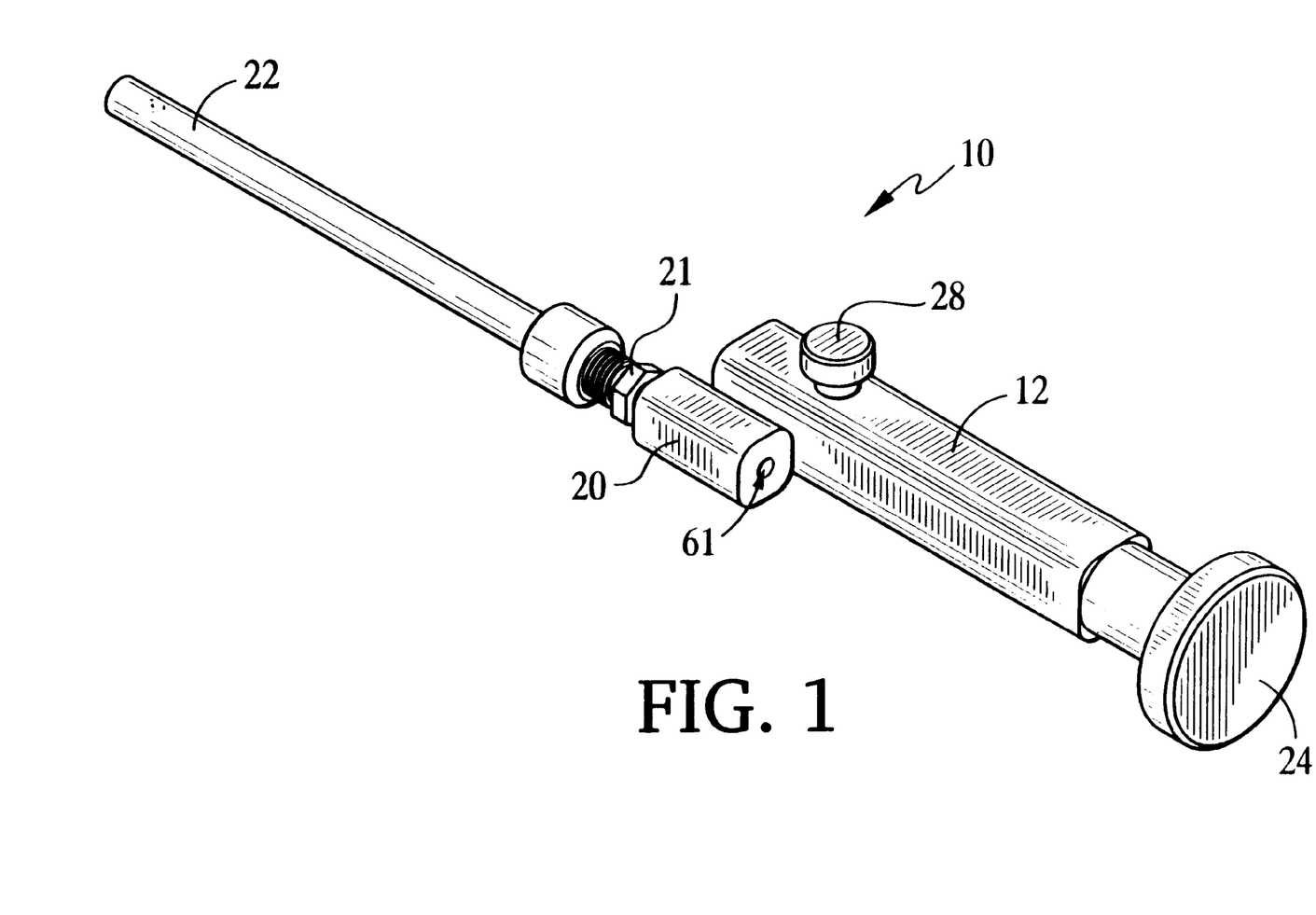
FIG. 1 is a perspective view of an injector with reservoir and batch chamber in side-by-side arrangement (no input fitting).
Figure 2:
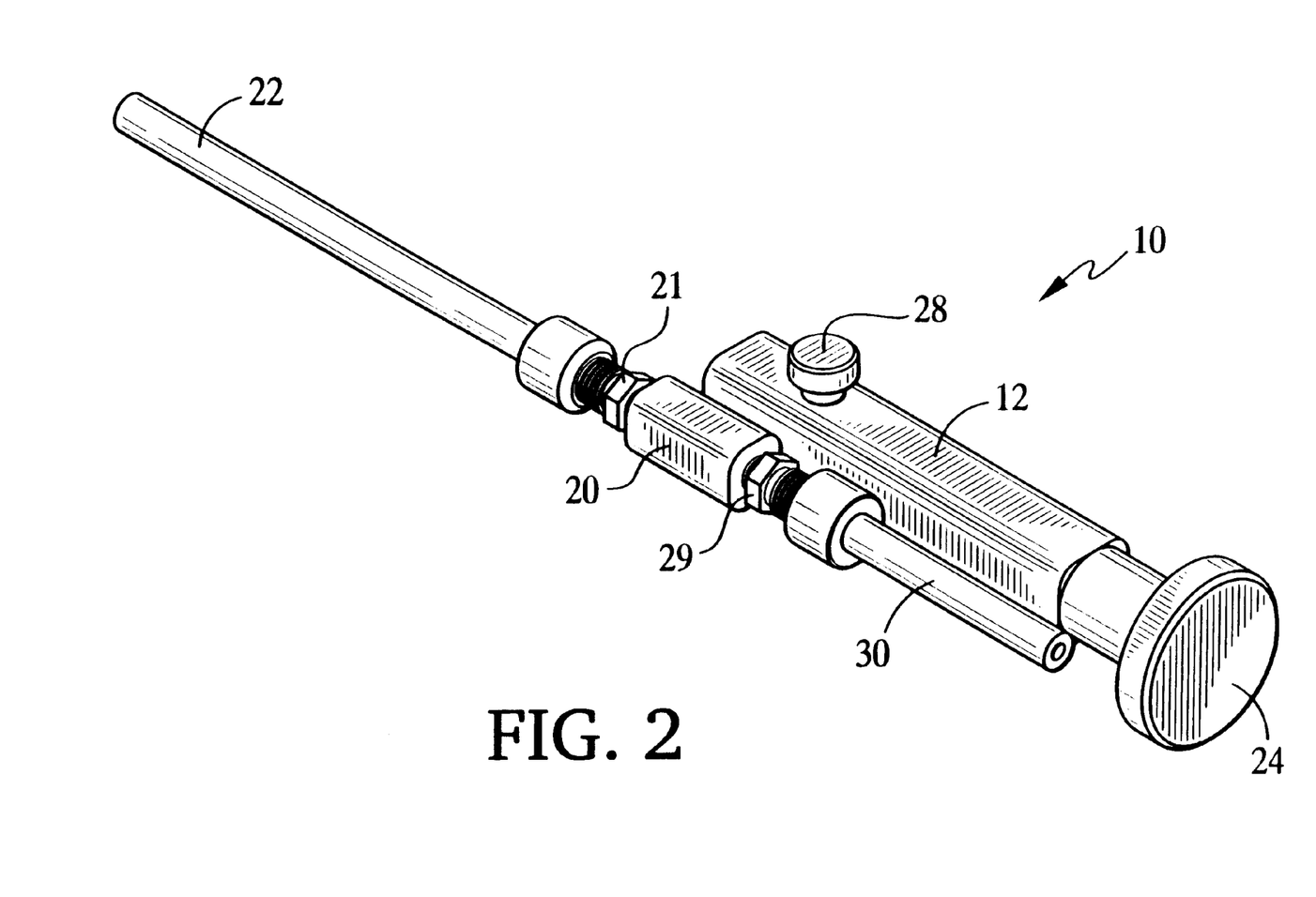
FIG. 2 is a perspective view of a an injector with reservoir and batch chamber in side-by-side arrangement (with input fitting).
Figure 3:
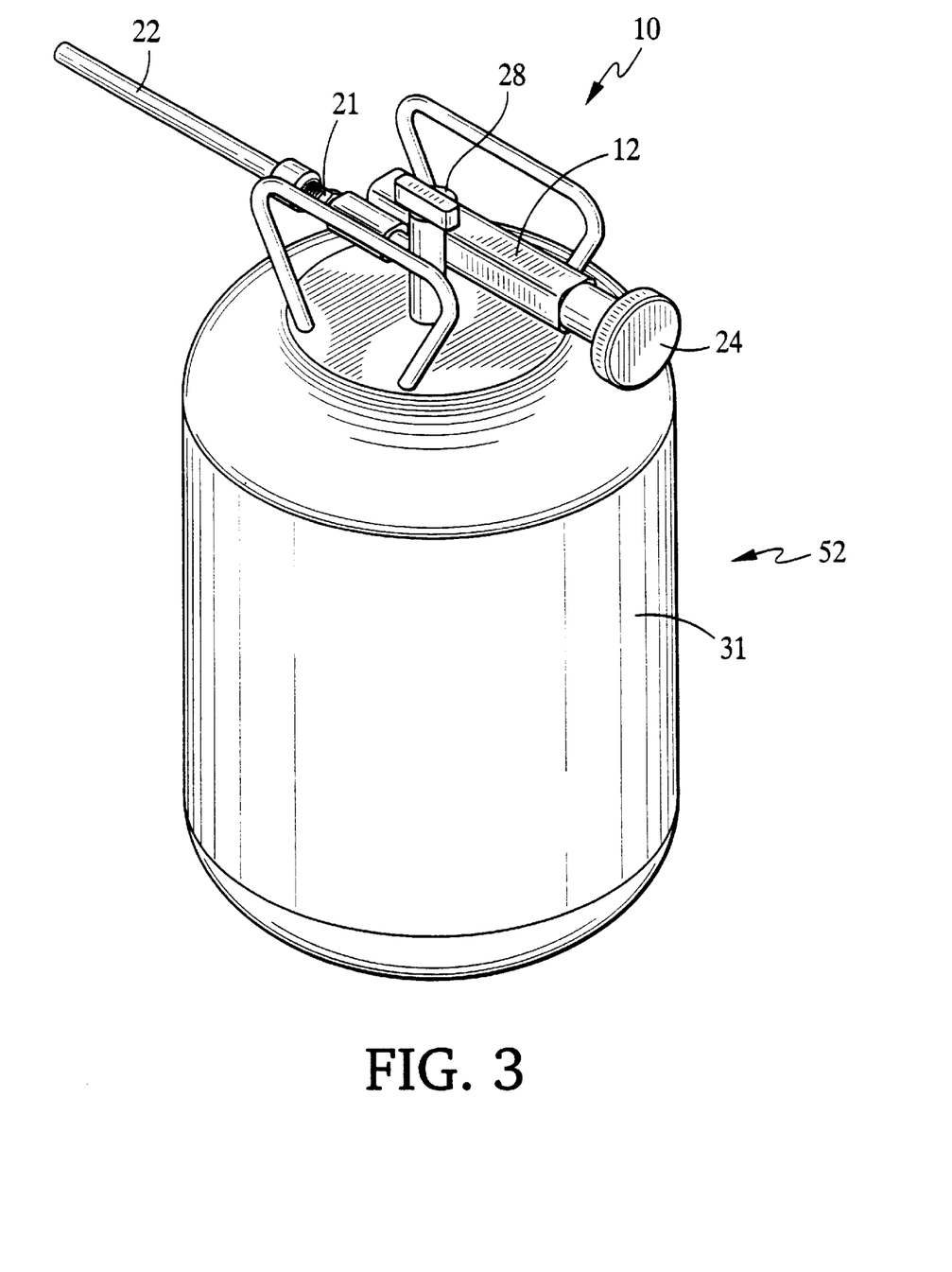
FIG. 3 is a perspective view of a refrigeration dye injector mounted on a 30 lb. refrigerant cylinder.

FIG. 3 shows the injector 10 of FIG. 1 mounted on a conventional 30-lb. refrigerant cylinder 31. For mounting the injector 10 on the cylinder 31, a suitable fitting is employed to mate the fluid input port 61 (shown in FIG. 1) on the injector 10 to the cylinder output fitting (not shown) on the cylinder 31.

Figure 4:
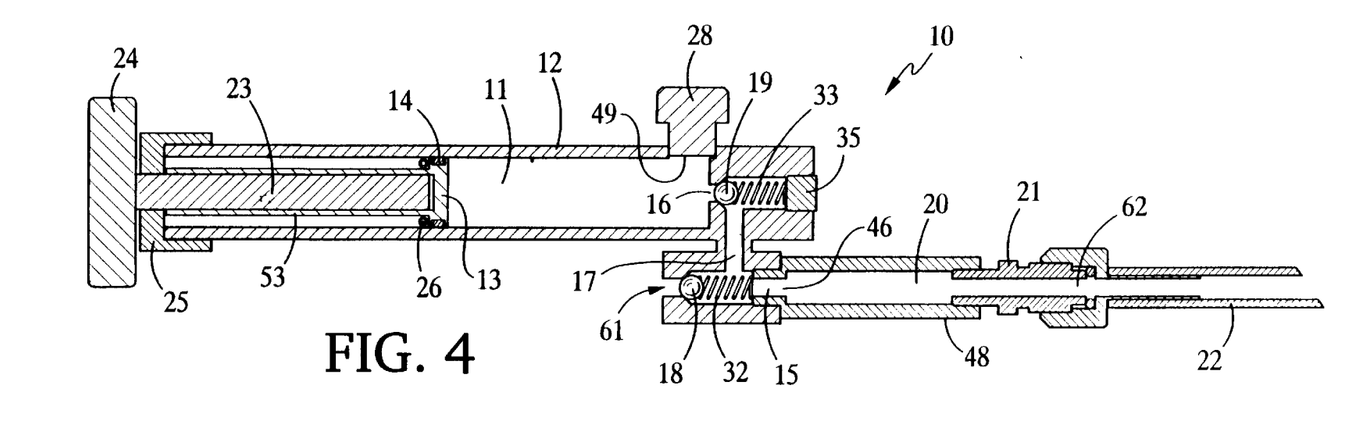
FIG. 4 is a sectional view of the injector depicted in FIG. 1.
Figure 5:
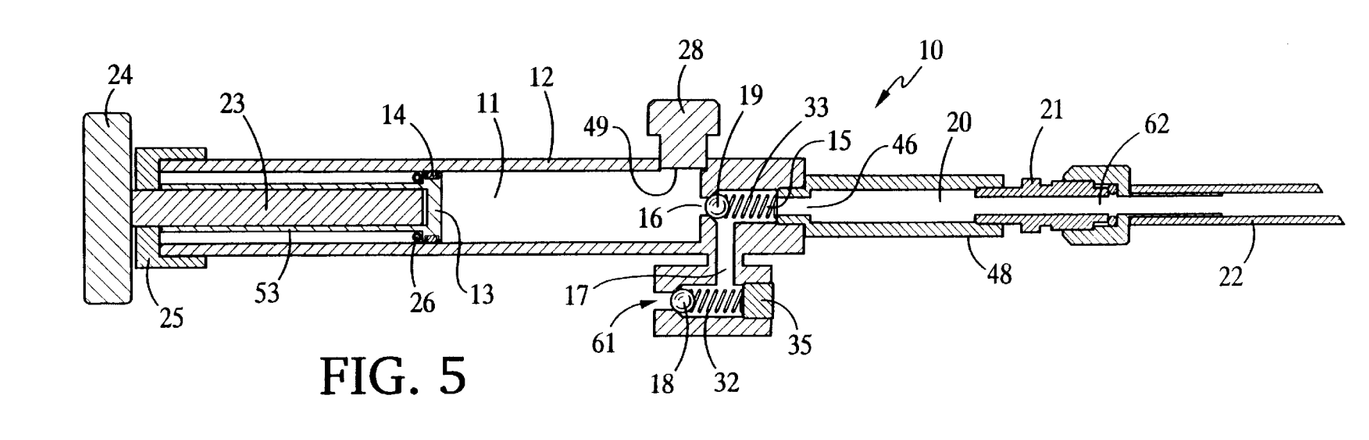

FIG. 5 shows an embodiment similar to that shown in FIGS. 1–4, except that the batch chamber 20 is located axial to, i.e., in-line with, the liquid reservoir 11. If a plug 35 and the batch chamber 20 are threaded with the same threads, they can be interchanged. This permits the embodiment shown in FIGS. 1–4 to be converted to the embodiment in FIG. 5, or vice versa.

Figure 6:
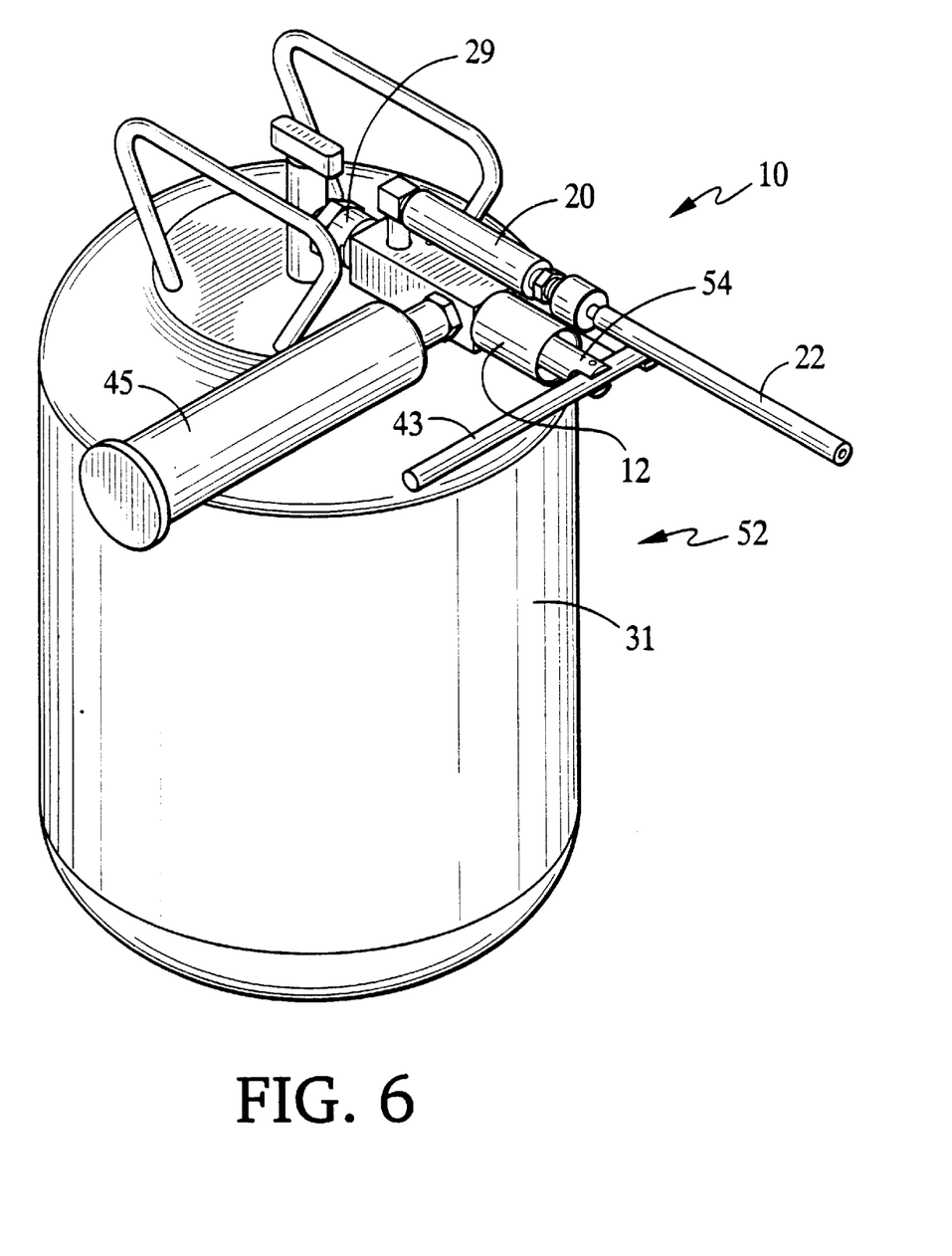
FIG. 6 is a perspective view of an injector that functions with a removable, pre-filled cartridge containing the liquid to be injected.
Figure 7:
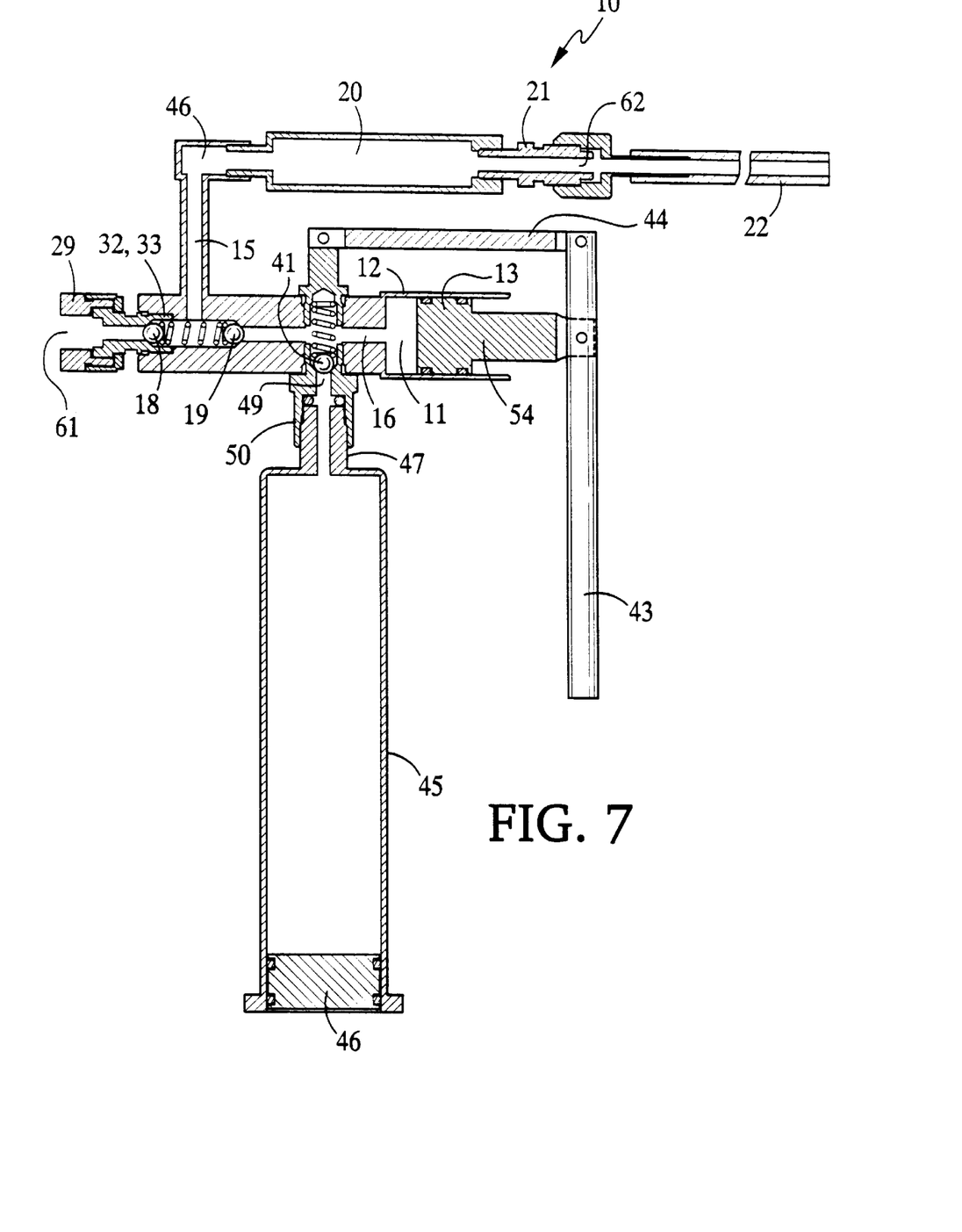
FIG. 7 is a sectional view of the injector shown in FIG. 6.

FIGS. 6 and 7 show another embodiment of the invention. In FIG. 6, the injector 10 is mounted on a conventional 30-lb. refrigerant cyclinder. In this embodiment, the reservoir fill port 49 is fitted with a threaded reservoir input fitting 50 that receives a threaded output fitting 47 on a detachable, pre-filled dye cartridge 45. A pump handle 43 is connected to a pivot bar 44 and the piston rod 54. When the pump handle 43 is lifted, the piston 13 is drawn back, output check valve 19 remains closed, and cartridge check valve 41 opens, allowing dye from the dye cartridge 45 to be drawn into the reservoir 11. When the pump handle 43 is depressed, dye is expelled from the reservoir 11, past the reservoir output check valve 19, into the fluid flow path 15, through the fluid output port 46, and into the batch chamber 20. In this embodiment, the ratio of reservoir 11 volume to batch chamber 20 volume is about 1:1. The capacity of the detachable dye cartridge 45 is several times the volume of the reservoir 11. Thus, the device 10 is capable of multiple injections, even if the liquid reservoir 11 is emptied completely, upon each injection.

Figure 8:
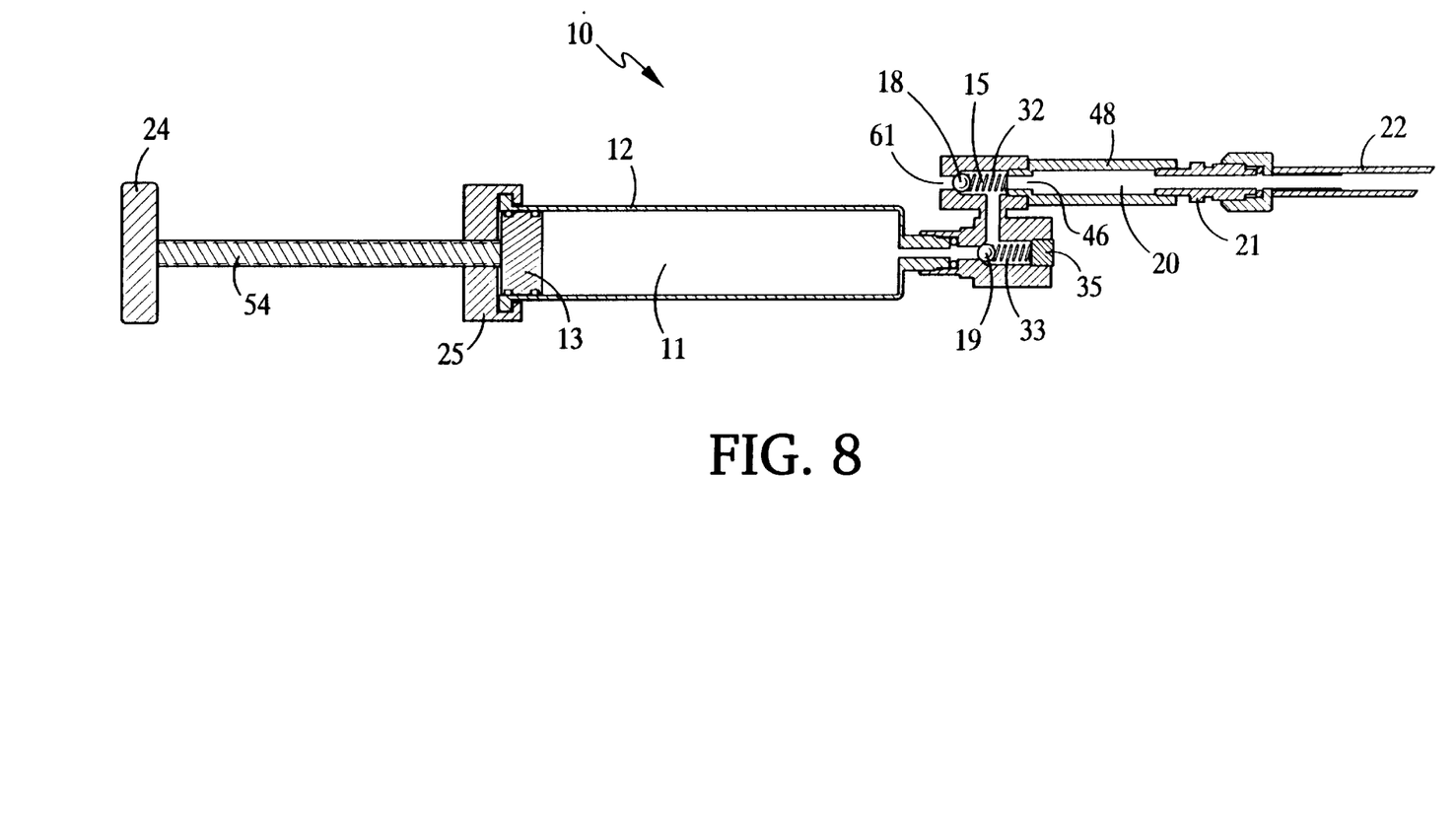
FIG. 8 is a sectional view of an injector wherein a piston push rod and actuator knob translate axially.

FIG. 8 shows an embodiment similar the embodiments in FIGS. 4 and 5, except that in FIG. 8 the piston 13 is moved by a threaded piston rod 54 engaging threads in an end cap 25, instead of a threaded push rod 23 engaging a threaded piston sleeve 53.

Figure 9:
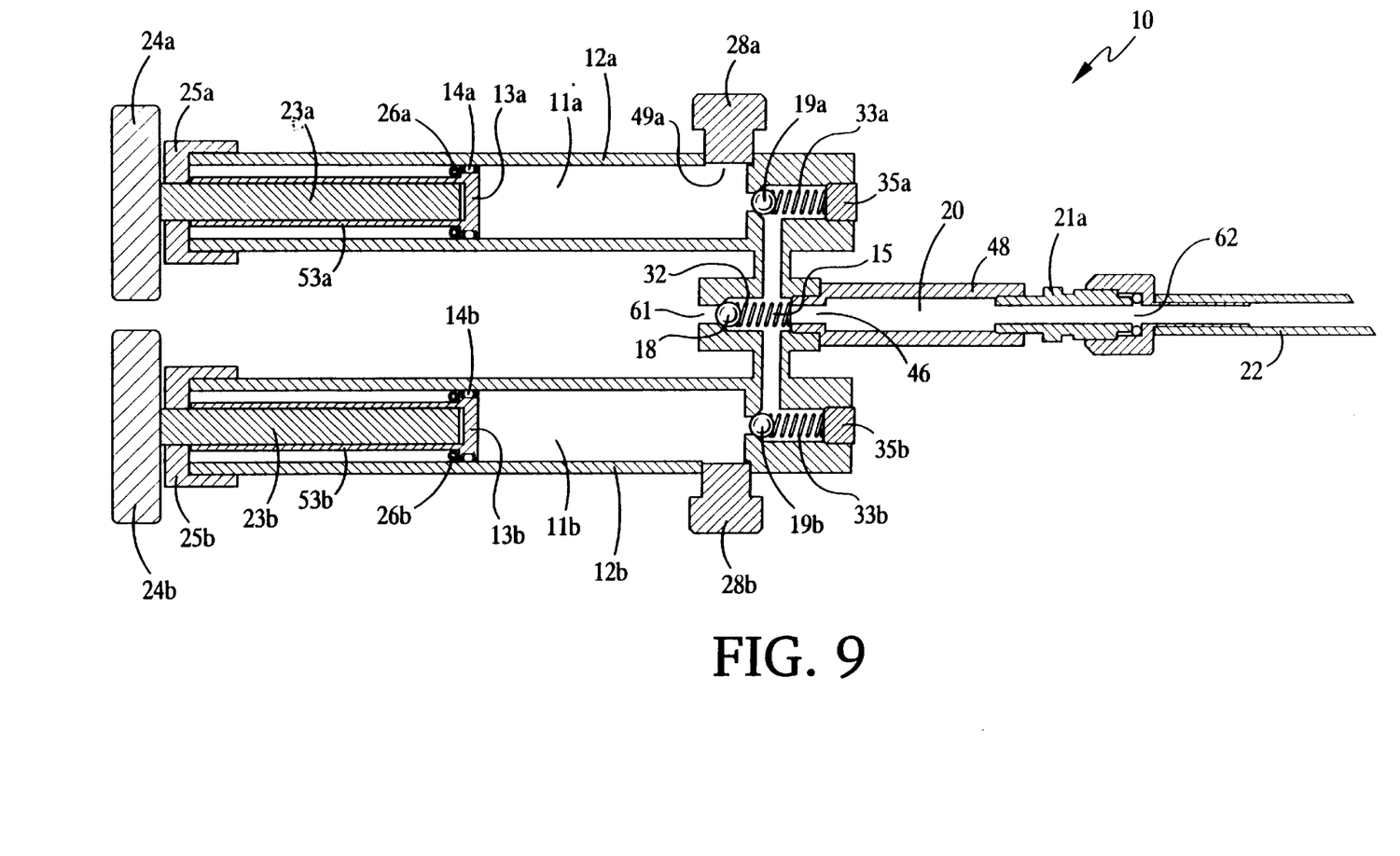
FIG. 9 is a sectional view of a dual-function injector.

FIG. 9 shows a dual-function injector. Each of the two liquid reservoirs 11a, 11b can contain a different liquid, e.g., a fluorescent leak detection dye in reservoir 11a and a compressor lubricant in reservoir 11b. In the dual-function injector, there is a single fluid input port 61 and a single fluid output port 62, which together define a single fluid flow path. The single fluid flow path is connected to two isolated liquid reservoirs 11a, 11b (and associated components), each of which operates independently, essentially as described above, with respect to FIGS. 4 and 5. Although the respective pairs of liquid reservoirs (and associated components) in FIG. 9 are depicted identically, the members of a pair can differ in size, and in other ways.

Figure 10:
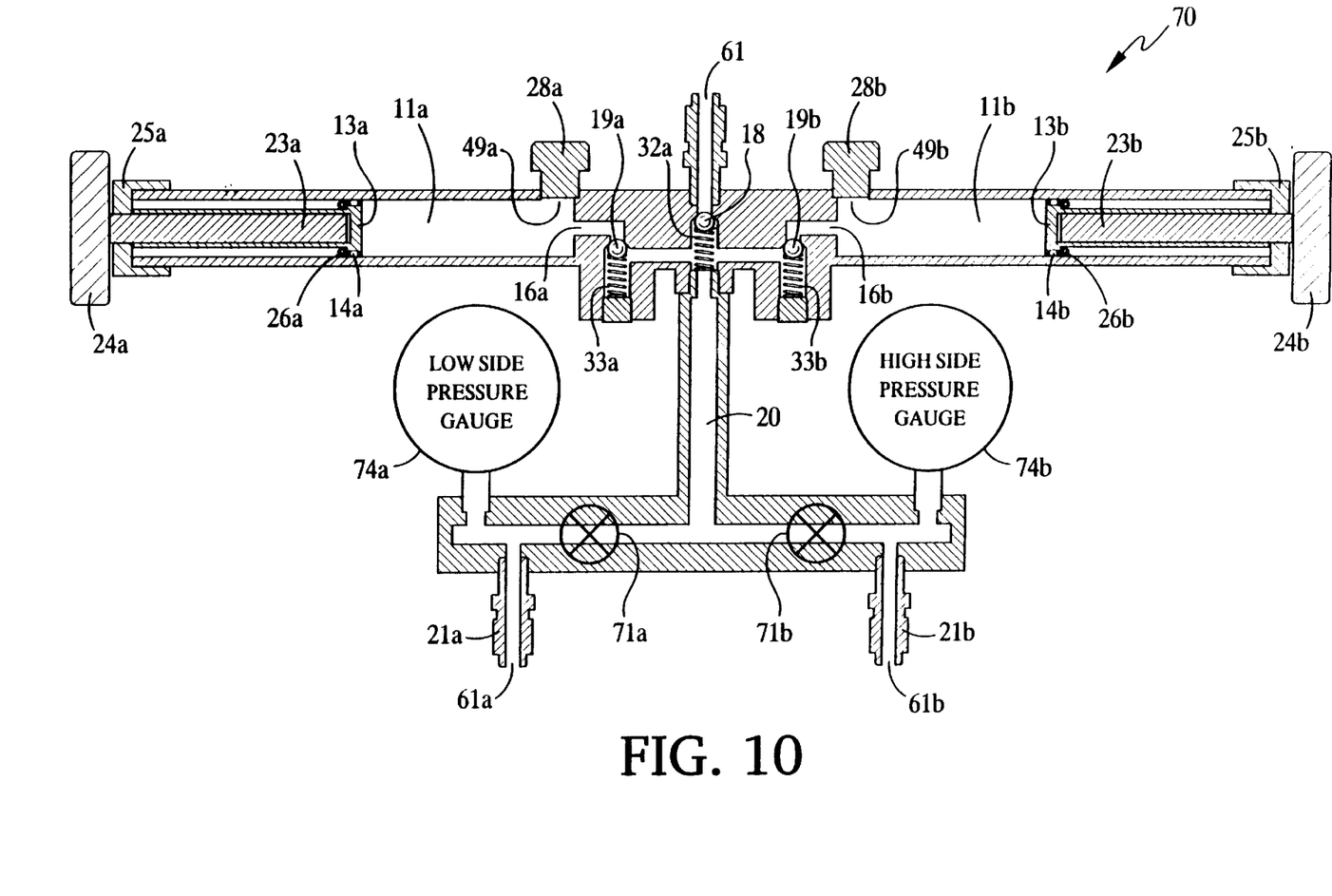
FIG. 10 is a sectional view of a device that includes a dual-function injector and a gauge set.

FIG. 10 shows combination device 70 that includes a dual-function injector and a gauge set, for use in servicing refrigeration systems, e.g., automobile air conditioners. The device 70 includes a "low side" output fitting 21a, low side pressure gauge 74a, and low side shutoff valve 71a; a "high side" output fitting 21b, high side pressure gauge 74b, and high side shutoff valve 71b; and a refrigerant input port 61. The gauge set portion of the combination device 70 is used as a conventional gauge set would be used. The injector portion of the device functions as described above, in connection with FIGS. 4, 5 and 9. A dual-function injection (with or with a gauge set) also can be based on an alternative injector design, for example, a cartridge-type design shown in FIG. 7.

Figure 11:
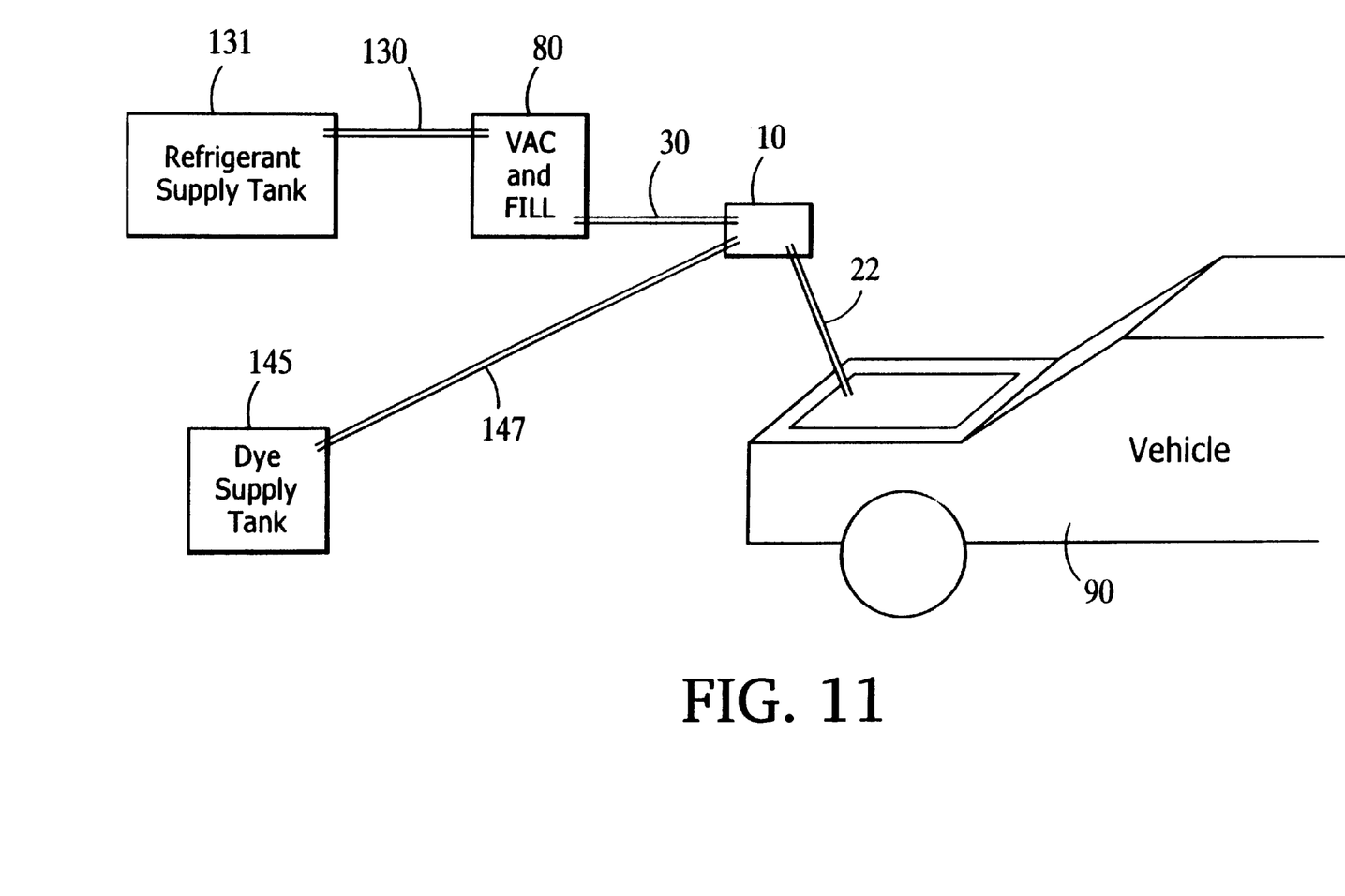
FIG. 11 is a schematic diagram illustrating the use of the invention in the initial filling of an automobile air conditioning system, during the automobile manufacturing process.

FIG. 11 schematically illustrates the use of the invention in the filling (initial charging) of a mobil air conditioning system, during a vehicle manufacturing process. After the air conditioning system (not shown) is assembled in the vehicle 90, the system must be filled with refrigerant, and leak detection dye must be introduced into the system, without contaminating the exterior of the air conditioning system with dye. In the auto industry, an apparatus commonly called a "vac and fill" machine is used to remove air from the air conditioning system, and then to place refrigerant from the refrigerant supply source into the air conditioning system in the vehicle 90.

In the arrangement illustrated in FIG. 11, the dye flows from a dye supply tank 145 through a dye supply hose 147 into the injector 10. In the injector 10 the dye is expelled, on demand, through a one-way valve (not shown) into a fluid flow path (not shown), and into a batch chamber (not shown). Refrigerant flows from a refrigerant supply tank 131, through a refrigerant supply hose 130, into a vac and fill apparatus 80. From the vac and fill apparatus 80 the refrigerant flows through an injector input hose 30 and into the injector 10. In the injector 10 the refrigerant goes through the fluid flow path and into the dye-filled batch chamber, from which it sweeps a preselected amount of dye into the output hose 22, and into the air conditioning system in the vehicle 90. When the output hose 22 is disconnected from the air conditioning system, no liquid dye is present at the fittings. Thus, the injector 10 advantageously avoids dye contamination on exterior surfaces in the vehicle 90.

In the injector shown schematically in FIG. 11, the liquid-expelling mechanism can involve a cylinder and piston, e.g., essentially as shown in FIG. 7. However, the dye also can be expelled by means other than a piston. For example, if the injector 10 is incorporated into an automated assembly line, a pump can be used to expel a predetermined amount of dye, in response to a signal from a digital controller. Any of various types of pumps, e.g., peristaltic, piston, gear, vane, or diaphragm, can be used to expel the dye. Although FIG. 11 shows the dye supply tank 145 as a separate component linked to the injector 10 by a dye supply line 147, the dye could be supplied from a dye source, e.g., a tank, reservoir, or disposable cartridge, integrated as part of the injector device 10.

The system depicted in FIG. 11 can be used to place materials other than, or in addition to, dye into the vehicle air conditioning system. For example oil from a separate supply line can be used to expel dye, followed by oil, into a batch chamber. In another example, a mixture of oil and dye can be placed in the dye supply tank 145.

Although FIG. 11 shows the injector 10 as a separate device connected between the vac and fill machine and the air conditioning system, other connection arrangements can be employed. For example, the injector 10 can be integrated into the vac and fill machine, or connected between the vac and fill machine and the refrigerant supply tank.

Other embodiments are within the following claims.

We claim:

1. A device for introducing a liquid or paste into a closed, fluid system, comprising:
   a fluid flow path between a fluid input port and a fluid output port;
   a liquid reservoir;
   a one-way reservoir output valve between the liquid reservoir and the fluid flow path, which valve is biased toward closure of a liquid reservoir outlet; and
   a liquid-expelling mechanism, whereby liquid or paste can be expelled from the liquid reservoir, through the one-way reservoir output valve, into the fluid flow path.

2. The device of claim 1, wherein the liquid expelling mechanism comprises a piston.

3. The device of claim 1, further comprising a one-way fluid input valve biased toward closure of the fluid input port.

4. The device of claim 1, further comprising a batch chamber in fluid communication with the fluid output port.

5. The device of claim 4, wherein the ratio of liquid reservoir volume to batch chamber volume is at least 2:1.

6. The device of claim 3, wherein the batch chamber includes a substantially transparent wall.

7. The device of claim 1, further comprising a liquid flow path between the one-way reservoir output valve and the fluid flow path.

8. The device of claim 7, wherein the refrigeration system is a mobil air conditioning system.

9. The device of claim 7, wherein the refrigeration system is a stationary refrigeration system.

10. The device of claim 1, wherein the piston comprises a push rod.

11. The device of claim 10, wherein the push rod is threaded.

12. The device of claim 11, further comprising an actuation knob.

13. The device of claim 12, wherein the actuation knob is calibrated in relation to the liquid reservoir volume.

14. The device of claim 1, wherein a one-way valve biased in the closed position is located at a reservoir fill port.

15. The device of claim 14, wherein the piston comprises a push rod, a handle and a handle pivot bar.

16. The device of claim 14, further comprising a reservoir input fitting compatible with an output fitting on a liquid source.

17. The device of claim 16, wherein the ratio of liquid reservoir volume to batch chamber volume is about 1:1.

18. The device of claim 1, further comprising
a second liquid reservoir;
a second liquid reservoir outlet port;
a second liquid flow path connecting the second liquid reservoir to the fluid flow path; and
a one way valve between the second liquid reservoir outlet port and the fluid flow path, wherein the one-way valve is biased toward closure of the second reservoir outlet port.

19. The device of claim 1, further comprising a shutoff valve at the end of an output hose.

20. A refrigeration system service apparatus comprising a refrigerant reservoir in fluid communication with the injector device of claim 1.

21. A method for introducing a liquid into a closed system, comprising:
providing a fluid flow path comprising a one-way fluid input valve and a fluid output port;
providing a liquid reservoir;
providing a one-way reservoir output valve that permits liquid to flow from the liquid reservoir into the fluid flow path at a point between the fluid input valve and the fluid output port;
connecting the fluid flow path into the closed system; and
expelling liquid from the liquid reservoir, through the one-way reservoir output valve, into the fluid flow path at a point between the fluid input valve and the fluid output port.

22. A method for introducing a paste into a closed system, comprising:
providing a fluid flow path comprising a one-way fluid input valve and a fluid output port;
providing a liquid reservoir;
providing a one-way reservoir output valve that permits paste to flow from the liquid reservoir into the fluid flow path at a point between the fluid input valve and the fluid output port;
connecting the fluid flow path into the closed system; and
expelling paste from the liquid reservoir, through the one-way reservoir output valve, into the fluid flow path at a point between the fluid input valve and the fluid output port.

23. The method of claim 21 or 22, wherein the closed system is a refrigeration system.

24. The method of claim 21, wherein the liquid is a dye or a lubricant.

25. The device of claim 1, further comprising a batch chamber in fluid communication with the fluid output port, the batch chamber being capable of fluidly connecting to an output hose.

26. The apparatus of claim 20, wherein the refrigerant reservoir fluidly communicates with the fluid input port whereby refrigerant flows through the fluid flow path to sweep the liquid or paste into the closed, fluid system.

27. The method of claim 21 or 22, further comprising passing a fluid through the fluid flow path into the system after expelling.

28. A device for introducing a liquid or paste into a refrigeration or air conditioning system comprising:
a fluid flow path between a fluid input port and a fluid output port, the fluid input port including a one-way fluid input valve biased toward closure of the fluid input port, the fluid input port capable of being fluidly connected to a supply of fluid;
a batch chamber in fluid communication with the fluid output port, the batch chamber being capable of fluidly connecting to an output hose;
a liquid reservoir;
a one-way reservoir output valve between the liquid reservoir and the fluid flow path, which valve is biased toward closure of a liquid reservoir outlet; and
a liquid-expelling mechanism arranged to expel liquid or paste from the liquid reservoir, through the one-way reservoir output valve, and into the fluid flow path.

29. The device of claim 1 or 28, further comprising a dye cartridge.

30. The device of claim 28, further comprising a shutoff valve at the end of an output hose.

31. A method for introducing a dye or a lubricant into a closed system, comprising:
connecting a fluid flow path into the closed system, the fluid flow path comprising a one-way fluid input valve and a fluid output port;
expelling a liquid or paste from a reservoir, through a one-way reservoir output valve between the liquid reservoir and the fluid flow path, which valve is biased toward closure of a liquid reservoir outlet and permits liquid to flow from the reservoir, into the fluid flow path at a point between the fluid input valve and the fluid output port; and
passing a fluid through the fluid flow path into the system to sweep the liquid or the paste into the system.

32. The method of claim 31, wherein the liquid or the paste includes a dye or a lubricant.

* * * * *